(12) United States Patent
Nepote et al.

(10) Patent No.: US 10,170,927 B2
(45) Date of Patent: Jan. 1, 2019

(54) APPARATUS FOR MANAGING THE ENERGY SUPPLIED TO A LOW-VOLTAGE SYSTEM OF A MOTOR VEHICLE THAT COMPRISES AN ENERGY-RECOVERY STAGE, AND CORRESPONDING METHOD

(71) Applicants: Magneti Marelli S.p.A., Corbetta (IT); Sistemi Sospensioni S.p.A., Corbetta (IT)

(72) Inventors: Andrea Nepote, Corbetta (IT); Giordano Greco, Corbetta (IT); Piero Antonio Conti, Corbetta (IT)

(73) Assignees: Magneti Marelli S.p.A., Corbetta (IT); Sistemi Sospensioni S.p.A., Corbetta (IT)

( * ) Notice: Subject to any disclaimer, the term of this patent is extended or adjusted under 35 U.S.C. 154(b) by 0 days.

(21) Appl. No.: 15/804,723

(22) Filed: Nov. 6, 2017

(65) Prior Publication Data
US 2018/0131222 A1  May 10, 2018

(30) Foreign Application Priority Data

Nov. 8, 2016  (IT) .................. 102016000112547

(51) Int. Cl.
| | |
|---|---|
| *H02P 6/00* | (2016.01) |
| *H02J 7/24* | (2006.01) |
| *H02P 6/04* | (2016.01) |
| *H02J 7/14* | (2006.01) |
| *B60L 11/18* | (2006.01) |
| *B60L 1/00* | (2006.01) |
| *H02J 1/00* | (2006.01) |
| *B60G 13/14* | (2006.01) |

(52) U.S. Cl.
CPC ............... *H02J 7/242* (2013.01); *B60L 1/00* (2013.01); *B60L 11/1868* (2013.01);
(Continued)

(58) Field of Classification Search
CPC ..... H02P 6/04; H02J 7/1423; H02J 2001/008; B60L 2210/12
(Continued)

(56) References Cited

U.S. PATENT DOCUMENTS 4,604,528 A * 8/1986 Norton .................. H02J 7/1438
307/31
5,166,538 A * 11/1992 Norton .................. H02J 7/1438
307/10.1
(Continued)

FOREIGN PATENT DOCUMENTS

| EP | 2821265 A1 | 1/2015 |
|---|---|---|
| JP | 2005192298 A | 7/2005 |

OTHER PUBLICATIONS

Italian Search Report dated Jul. 5, 2017 for Italian Patent Application No. 201600112547.

*Primary Examiner* — Julio C. Gonzalez R.
(74) *Attorney, Agent, or Firm* — Howard & Howard Attorneys PLLC

(57) ABSTRACT

An apparatus and a method for managing the energy supplied to a low-voltage system of a vehicle. The low-voltage system includes a battery, which supplies the first voltage on a low-voltage bus. A system for charging the battery includes an alternator for supplying a charging voltage to the battery, and motor-vehicle loads supplied by the battery and/or by the alternator. A high-voltage system operates at a second voltage higher than said first voltage. The high-voltage system includes the vehicle energy-recovery stage. The second voltage is supplied through an intermediate energy-storage system and a DC-DC converter. A control module that carries out energy-management operations at least by the alternator. The second voltage of the DC-DC converter is regulated via a control procedure of a hysteretic type.

10 Claims, 13 Drawing Sheets

(52) U.S. Cl.
    CPC .............. *H02J 7/1423* (2013.01); *H02P 6/04* (2013.01); *B60G 13/14* (2013.01); *B60L 2210/12* (2013.01); *B60L 2210/30* (2013.01); *B60L 2240/547* (2013.01); *H02J 2001/008* (2013.01)

(58) Field of Classification Search
    USPC .............................................. 322/44, 28, 24
    See application file for complete search history.

(56) References Cited

U.S. PATENT DOCUMENTS

| | | | |
|---|---|---|---|
| 5,793,189 A * | 8/1998 | Kawaguchi | B60L 11/1859 320/125 |
| 7,932,634 B2 * | 4/2011 | Bourilkov | H02J 7/34 307/46 |
| 9,816,475 B1 * | 11/2017 | Buchanan | F02N 11/0866 |
| 2002/0027425 A1 * | 3/2002 | Asao | H02J 7/1438 322/28 |
| 2005/0254273 A1 * | 11/2005 | Soudier | H02M 3/28 363/103 |
| 2012/0141895 A1 * | 6/2012 | Kwon | H01M 8/04037 429/429 |
| 2013/0113283 A1 * | 5/2013 | Shiek | H02J 7/00 307/31 |
| 2014/0070608 A1 * | 3/2014 | Achhammer | H02J 1/08 307/10.1 |
| 2014/0210389 A1 | 7/2014 | Niwa et al. | |
| 2018/0131213 A1 * | 5/2018 | Nepote | B60L 11/1851 |

* cited by examiner

APPARATUS FOR MANAGING THE ENERGY SUPPLIED TO A LOW-VOLTAGE SYSTEM OF A MOTOR VEHICLE THAT COMPRISES AN ENERGY-RECOVERY STAGE, AND CORRESPONDING METHOD

CROSS-REFERENCE TO RELATED APPLICATIONS

The present application claims priority to and all the benefits of Italian Patent Application No. 102016000112547, filed on Nov. 8, 2016, which is hereby expressly incorporated herein by reference in its entirety.

BACKGROUND OF THE INVENTION

1. Field of the Invention

The present invention relates to an apparatus and a method for managing the energy supplied to a low-voltage system of a vehicle, in particular a motor vehicle, that comprises an energy-recovery stage. The low-voltage system, operating at a first voltage, includes a battery, which supplies the first voltage on a low-voltage bus. A system for charging the battery includes an alternator for supplying a charging voltage to the battery, and motor-vehicle loads supplied by the battery and/or by the alternator. A high-voltage system operates at a second voltage higher than said first voltage. The high-voltage system includes the vehicle energy-recovery stage, which supplies said second voltage. The second voltage is supplied through an intermediate energy-storage system and a DC-DC converter, which converts the second voltage into the first voltage on said low-voltage bus. A control module that carries out energy-management operations at least by the alternator. The second voltage of the DC-DC converter is regulated via a control procedure of a hysteretic type comprising an operation of threshold comparison with hysteresis of the value of the second voltage and an operation of activation or deactivation of the DC-DC converter on the basis of the result of the comparison operation.

2. Description of the Related Art

In the automotive sector, energy-recovery systems are known. In particular, known to the art are energy-recovery systems that use regenerative shock absorbers, which convert movements of the shock absorber into electrical energy.

In this context, for example, of particular interest from the standpoint of conversion efficiency are regenerative shock absorbers, which convert the linear motion of the stem into a rotary motion of the shaft of an electric generator, from which it is hence possible to recover, in the form of electricity, the energy that would otherwise be dissipated in the form of heat. It is known to perform this conversion via mechanical or hydraulic means so that rotation of the shaft of the electric generator is always in the one and the same direction, irrespective of the direction of movement of the stem. This enables a better efficiency of conversion of the energy, from kinetic into electrical. The electric generator is usually a DC generator, which supplies a DC voltage at output. If, instead, a synchronous generator is employed, an inverter is used. Either way, it is in any case necessary to use a DC-DC converter to adapt the output voltage of the electric generator to the battery of the vehicle, in particular of the motor vehicle.

It is likewise known to use a converter stage for conversion from high voltage to low voltage, specifically a DC-DC converter the output voltage of which is controlled in order to match it to the battery voltage, as in the case of the regulator of an alternator.

Illustrated in FIG. 1 is a circuit diagram representing an electro-mechanical model of a known energy-recovery apparatus, designated as a whole by the reference number 10. Designated by 11 is a shaft of an electric generator 12, associated to which are an angular velocity $\dot{\theta}$ and a torque τ. $R_{og}$ denotes the output resistance of the electric generator 12, for example, a DC generator, whilst denoted by $R_e$ is the equivalent resistance of the circuits of the portion of apparatus downstream of the electric generator 12, i.e., the resistance seen by the electric generator 12, the equivalent resistance $R_e$ being regulated, for example, by the aforementioned inverter. Denoted by $V_{og}$ is the loadless voltage of the electric generator 12, denoted by $I_g$ is the current of the generator 12, and denoted by $V_{inDCDC}$ is the voltage that is set up on the equivalent resistance $R_e$.

Consequently, from the foregoing discussion, it follows that it is possible to control damping of the shock absorber by acting on the equivalent resistance $R_e$ seen by the electric generator 12. However, the fact of having to act on the equivalent resistance $R_e$ to control damping rules out the possibility of operating, as in other energy-harvesting systems, by matching the impedance of the DC-DC converter to the output impedance of the electric generator 12 in order to maximise power transfer.

Illustrated in FIG. 2 is an apparatus, designated as a whole by the reference number 90, for managing the charge of a battery 14.

The aforesaid apparatus for managing battery charge comprises an energy-recovery stage 30, which includes a plurality of regenerative shock absorbers 12, in particular four regenerative shock absorbers, associated to respective AC-DC converters in the form of inverters 13, the outputs of which are gathered in a single output node of the energy-recovery stage 30.

The output node of the energy-recovery stage 30 basically corresponds to a high-voltage bus HV, formed on which are a voltage $V_{inDCDC}$, which is the voltage on the DC side of the inverters 13, and an inverter output current $I_{outINV}$, which is the sum of the four currents at output from the inverters 13. The voltage $V_{inDCDC}$ of the high-voltage bus HV is sent to the input of a high-voltage/low-voltage converter stage 50, which, in the example, comprises a DC-DC converter 23, set on which, in parallel with the input, is a storage element, i.e., a capacitance, $C_{DC}$. In variant embodiments, the storage element may be a battery. At input to the DC-DC converter 23 is an input current $I_{inDCDC}$ that is equal to the inverter output current $I_{outINV}$ minus the current that flows in the storage element $C_{DC}$. Of course, in the present context, the voltage on the high-voltage bus HV is defined as high with respect to the voltage on the other side of the DC-DC converter 23, i.e., on the low-voltage bus, which is instead at a lower voltage, and in general corresponds to the voltage of the electrical systems of the vehicle, usually 12 V.

In systems like the one described, where a higher-voltage system is connected, by means of a converter, to a lower-voltage system, namely, to the electrical systems connected to the battery of the vehicle, the high-voltage bus HV is referred to hereinafter as "DC-link bus", and the storage element $C_{DC}$ is referred to hereinafter as "DC-link capacitance" in so far as the DC-link capacitance in general corresponds to the capacitor connected at the input of the DC-DC converter 23, where the DC voltage to be converted to a lower voltage arrives. The DC-link capacitance is usually obtained via an electrolytic capacitor or a film capacitor that uncouples the input of the DC-DC converter.

The above DC-link capacitance $C_{DC}$ in the example described provides an intermediate energy-storage stage 40 at the input of the DC-DC converter 23. The voltage of the DC-link bus has, for example, a value of 48 V.

A DC-DC converter 23 is driven so as to control simultaneously the input voltage on the above storage capacitor $C_{DC}$ and an output current $I_{outDCDC}$ towards the low-voltage bus LV, i.e., the circuits downstream of the output of the DC-DC converter 23. The DC-DC converter 23 is generally a simple current-limited voltage regulator. Setting of the output current of the DC-DC converter 23 is made on the basis of the information on the battery-voltage set-point coming from the control unit in which the energy-management strategies reside and is generally available on the LIN (Local Interconnect Network) of the vehicle. The battery 14 is also connected to an alternator 60, which applies thereto a charging voltage $V_{ALT}$. A vehicle control unit 70, in particular the engine control unit, applies energy-management strategies via corresponding energy-management signals EM sent to the alternator 60. These energy-management strategies reside in the aforesaid control unit 70, and in particular regulate the charging voltage $V_{ALT}$ supplied by the alternator 60. Alternators of this type with charging voltage that can be controlled externally are usually defined as "smart alternators".

The apparatus illustrated in FIG. 2 presents some drawbacks.

In the first place, it is difficult to control the vehicle low-voltage bus in the presence of a number of generator devices, such as are the alternator and the regenerative shock absorbers, remaining in line with the existing energy-management strategies, i.e., with the voltage set by the smart alternator under the control of energy-management control signals sent by the engine control unit. Likewise, it is difficult to manage the DC-DC converter so as to regulate simultaneously the output current (and voltage) and the input voltage. It is also problematical to control the apparatus when the battery-voltage set-point is not available to the control modules, for example, the control units, as in the case where the alternator is of a classic type, without any possibility of external control, or else during acceleration, where the voltage set-point, even if it exists, cannot be used as such.

In particular, a problem is represented by the cases where the power supplied by the energy-recovery stage is higher than the power supplied at output by the DC-DC converter, so that the only possibility is to deactivate the DC-DC converter.

SUMMARY OF THE INVENTION

The object of the present invention is to provide an improved apparatus and an improved method that will enable the drawbacks referred to above to be overcome.

According to the present invention, the above object is achieved thanks to an apparatus and to a corresponding method having the characteristics recalled specifically in the ensuing claims. More specifically, the present invention relates to an apparatus and a method for managing the energy supplied to a low-voltage system of a vehicle, in particular a motor vehicle, that comprises an energy-recovery stage. The low-voltage system, operating at a first voltage, includes a battery, which supplies the first voltage on a low-voltage bus. A system for charging the battery includes an alternator for supplying a charging voltage to the battery, and motor-vehicle loads supplied by the battery and/or by the alternator. A high-voltage system operates at a second voltage higher than said first voltage. The high-voltage system includes the vehicle energy-recovery stage, which supplies said second voltage. The second voltage is supplied through an intermediate energy-storage system and a DC-DC converter, which converts the second voltage into the first voltage on said low-voltage bus. A control module that carries out energy-management operations at least by the alternator. The second voltage of the DC-DC converter is regulated via a control procedure of a hysteretic type comprising an operation of threshold comparison with hysteresis of the value of the second voltage and an operation of activation or deactivation of the DC-DC converter on the basis of the result of the comparison operation.

Other objects, features and advantages of the present invention will be readily appreciated as the same becomes better understood after reading the subsequent description taken in connection with the accompanying drawings.

BRIEF DESCRIPTION OF THE DRAWINGS

The invention will now be described with reference to the annexed drawings, which are provided purely by way of non-limiting example and in which.

DETAILED DESCRIPTION OF THE INVENTION

Figure 1:
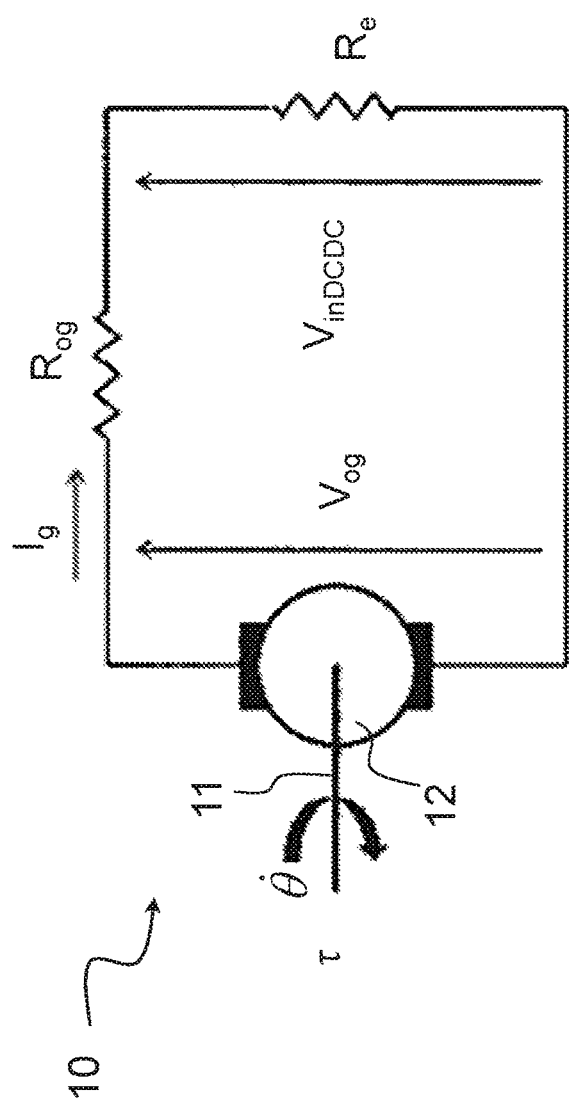
FIG. 1 is a circuit diagram representing an electro-mechanical model of a known energy-recovery apparatus.

In brief, the solution according to the invention regards an apparatus for managing the energy supplied to a low-voltage system of a vehicle that comprises an energy-recovery stage the low-voltage system, which operates at a first voltage, includes a battery, which supplies said first voltage on a low-voltage bus; a system for charging the battery, which comprises an alternator for supplying a charging voltage to said battery; and vehicle loads supplied by the battery and/or by the alternator. The vehicle includes a high-voltage system, operating at a second voltage higher than said first voltage. The system includes the vehicle energy-recovery stage, which supplies the second voltage. The second voltage is supplied through an intermediate energy-storage system to a DC-DC converter, which converts said second voltage into said first voltage on said low-voltage bus. The apparatus includes a control module that carries out energy-management operations at least by the alternator. The second voltage of the DC-DC converter is regulated via a control procedure of a hysteretic type comprising an operation of threshold comparison with hysteresis of the value of the second voltage and an operation of activation or deactivation of the DC-DC converter on the basis of the result of the comparison operation.

According to a main aspect of the solution described herein, the management apparatus comprises an additional load, which is set in parallel with the input of the converter and can be selectively connected to the high-voltage bus. If the power supplied by the energy-recovery stage is higher than a power absorbed by the converter, the apparatus keeps the DC-DC converter always activated, with a current limitation, and selects the connection of the additional load according to a further hysteretic control procedure, in particular based upon the voltage on the storage element or upon the state of charge.

The solution hence principally regards regulation of the voltage on the storage element, which basically corresponds to the voltage of the high-voltage bus at input to the DC-DC converter 23.

Described herein, however, is first the solution with reference to the regulation of the output current of the DC-DC converter on the low-voltage system that comprises the battery 14 and the alternator 60.

According to the solution described herein, the alternator 60 is, in one embodiment, of a smart-alternator type; i.e., it is an alternator that can vary its own charging voltage $V_{ALT}$. The charging voltage $V_{ALT}$ is supplied on the communication networks of the motor vehicle via the control signals sent by the control unit 70 of the vehicle, in particular the energy-management signals. The solution described herein may apply, however, also to variant embodiments in which a conventional alternator is used. As is known, the conventional alternator must remain at an internal reference voltage of its own. A target battery-voltage value is not hence available on the communication networks of the motor vehicle, but it is envisaged, for example, to estimate this target value on the basis of recent observations made when there is no transfer of energy from the DC-DC converter. In other words, the apparatus detects information on the regulated voltage from an estimation of the value of a charging voltage $V_{ALT}$ of the battery 14 obtained by detecting the value thereof in one or more working steps of the apparatus 90, in which there is no transfer of energy from the DC-DC converter 23.

The above alternator 60, which in the example described is a smart alternator, under the control of the control unit 70, has three operating modes, which are usually linked to different operating conditions of the motor vehicle.

A first, normal, operating mode envisages that the alternator 60 regulates the voltage of the battery 14 at a nominal operating value, making this regulation at a nominal value that depends, for example, upon the temperature and that responds to variations of the load. This first, normal, operating mode is usually associated to given conditions of state of charge (SOC) of the battery, defined specifically within a range from 70% to 80%. The first, normal, operating mode is implemented by driving the alternator 60 via the energy-management signals EM, in particular by supplying, as indication of nominal operating value necessary to obtain a nominal battery reference voltage of 12 V, for example, a charging voltage value $V_{ALT}$ of 13.8 V that the alternator 60 seeks to maintain as a function of the variation of other parameters, such as the loads. This is in general the prevalent operating mode, associated to a condition where the vehicle is travelling at a substantially constant speed, where the variations are mostly linked to variations of the loads.

A second operating mode, here referred to as "braking operating mode" because it is normally used when the motor vehicle is braking, envisages that the alternator 60, for example, in braking and coasting conditions, regulates the voltage of the battery at a battery-voltage value increased with respect to the low voltage of the low-voltage bus, for example, 15 V.

A third operating mode, here referred to as "acceleration operating mode" because it is normally used when the motor vehicle is accelerating, envisages that the alternator 60, in conditions of acceleration with charging disabled, regulates the battery voltage at a value slightly lower than the voltage of the low-voltage bus, in particular, for example, 11.8 V for a low voltage of 12 V.

Energy-management strategies, which are stored in and are under the control of a control unit, i.e., a device that includes at least one processor, of the motor vehicle (normally, the engine control unit), link the driving conditions, in particular the aforementioned three conditions of normal driving, braking, and acceleration, to the three operating modes. These strategies are in general in themselves known to the person skilled in the sector, and will not be described in detail.

The output of the above energy-management strategy is a battery-voltage reference $V_{bat\_ref}$ made available (normally on the network—LIN—of interconnection between components of the vehicle) by the control unit 70 and used by the smart alternator 60.

As has been mentioned, the strategy implemented by the energy-management procedures EM normally resides in the engine control unit (ECU) but could reside elsewhere, for example, in the body computer of the motor vehicle. The module controlled through the energy-management procedures EM in the control unit 70 is usually only the smart alternator 60, which receives the battery-voltage reference $V_{bat\_ref}$.

The solution described herein envisages, instead, supplying the above battery-voltage reference $V_{bat\_ref}$ also to the DC-DC converter 23, which uses it to implement a control method, preferably in a logic control module of its own, for selecting a procedure for regulation of the output voltage and current of the DC-DC converter from among the regulation procedures 200, 300, and 400 available to the DC-DC converter.

Figure 3A:
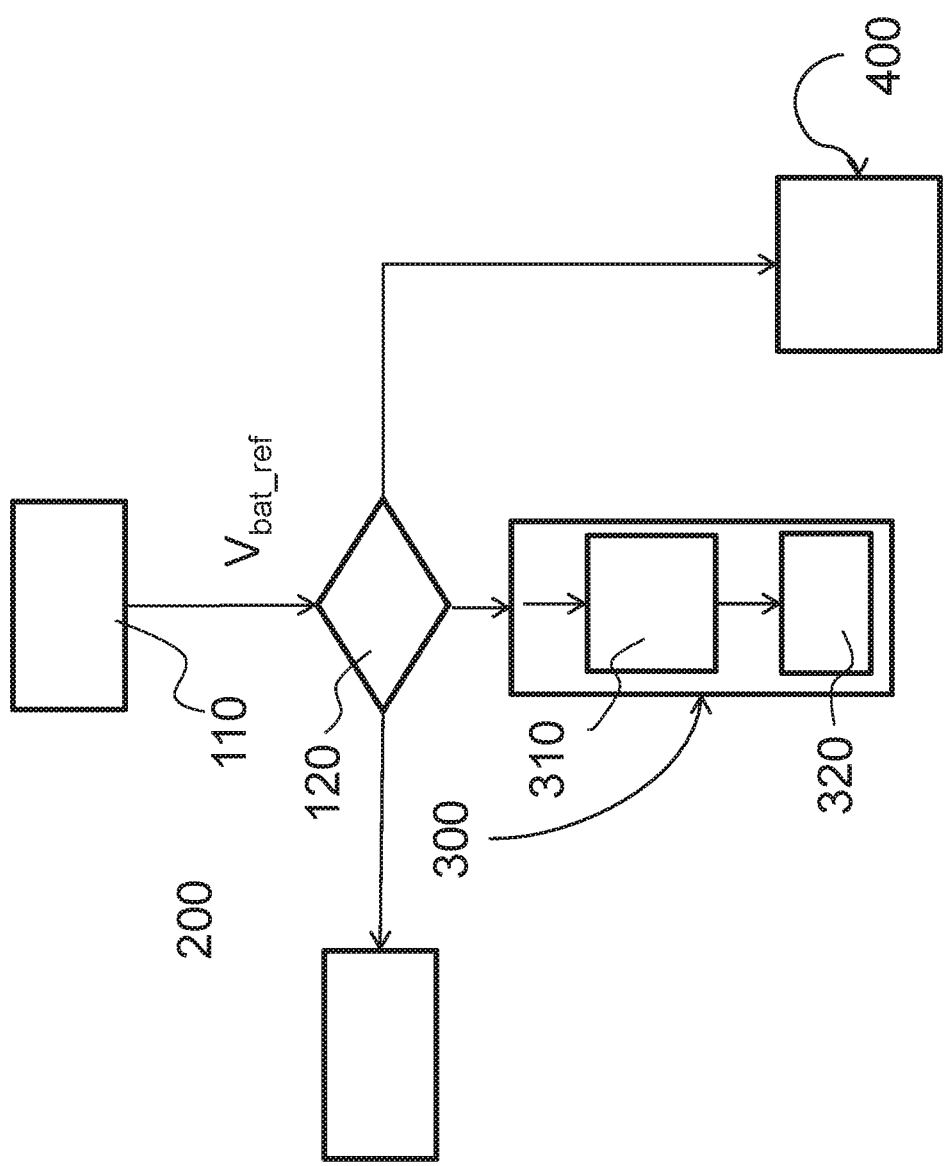
FIG. 3A represents a flowchart illustrating an embodiment of the management method described herein.

In this regard, FIG. 3A illustrates a flowchart representing the energy-management method 100 described herein, where, in a step 110 there is carried out acquisition of the battery-voltage reference $V_{bat\_ref}$ that is defined on the basis of the energy-management strategy EM described above, which defines the first, second, or third operating mode of the smart alternator 60, stored in a control unit 70, normally the engine control unit.

Hence, as illustrated in the figure, in a step 120 a check is made on the value of the battery-voltage reference $V_{bat\_ref}$.

If the value corresponds to the nominal low-voltage value, for example, it is higher than 11.8 V and lower than 15 V, a first regulation procedure 200 is carried out.

If the value is slightly lower than the voltage of the low-voltage bus, for example, 11.8 V for a low voltage of 12 V, a second regulation procedure 300 is carried out.

Hence, in general, the voltage that starts off the regulation procedure 200 is lower than the voltage that starts off the regulation procedure 300 and higher than the one that starts off the regulation procedure 400.

If the above value is a battery-voltage value increased with respect to the low voltage of the low-voltage bus, for example, 15 V, a third regulation procedure 400 is carried out.

The first regulation procedure 200 and the other procedures 300, 400 determine integration of the energy-recovery (or energy-harvesting) module 30, also acting on the DC-DC converter 23, i.e., on the stage 50, as a function of values, in particular the battery-voltage reference $V_{bat\_ref}$, supplied by the energy-management strategies EM already existing for control of the low-voltage side, more specifically the alternator 60. These strategies may, of course, be more complex, at a vehicle level.

The DC-DC converter 23 must acquire, for example via the local interconnection network (LIN), in addition to the battery-voltage reference $V_{bat\_ref}$ acquired in step 110 by the control unit where the energy-management system EM resides, in the example the engine control unit 70, other values that are used for carrying out the regulation procedures 200, 300, 400. In particular, the current set-points are acquired from the inverters 13, plus other information present on the CAN bus, for example which are the loads activated. The DC-DC converter 23 must moreover measure the input and output voltages to make the necessary regulations.

As has been mentioned, preferably the DC-DC converter 23 is self-regulated; i.e., it contains a logic control module, for example, a microprocessor, which, on the basis of the inputs listed above, implements the method 100, in particular the steps 110 and 120 and the procedures 200, 300, or 400. As an alternative to the logic control module inside the DC-DC converter 23, there may be an external control module, which executes the procedures 200, 300, 400 once again as a function of the information on the inputs listed above.

The first regulation procedure 200 carries out regulation in the context of an energy-management strategy EM, such as that of the first, normal, operating mode, which takes into account, for example, the temperature, in particular in SOC conditions of 70% to 80%, and indicates a voltage reference equal to the nominal low-voltage value. A SOC condition of 70% to 80% is the optimal one for regenerative recovery, in particular during braking.

Hence, the first regulation procedure 200 gets the energy-recovery module 30 to supply a power, on the low-voltage bus, without raising the level of voltage $V_{bat}$ of the battery 14 set by the smart alternator 60, in particular without raising it with respect to the nominal charging voltage value $V_{ALT}$, for example, 13.8 V.

This would be possible by setting the DC-DC converter at a voltage set-point value, i.e., a voltage $V_{outDCDC}$ at output from the DC-DC converter 23 that is a little higher than the battery voltage value $V_{bat}$ given by the energy-management signals EM coming from the control unit 70. However, this would mean not charging the battery 14 in accordance with the vehicle strategies; in particular the battery 14 would be charged with higher voltage and current.

Figure 3B:
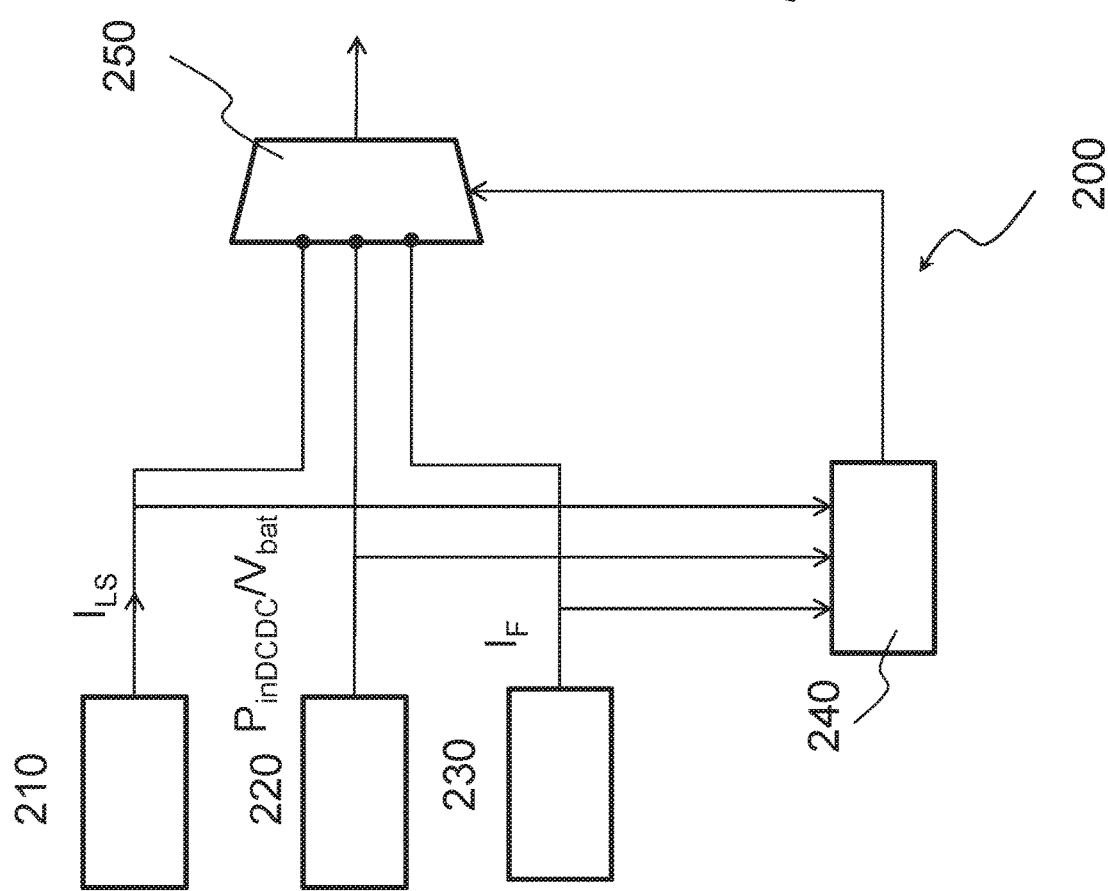
FIG. 3B represents a flowchart illustrating an embodiment of the management method described herein.

In this context, the first regulation procedure 200, represented schematically in the flowchart of FIG. 3B, comprises, instead:

an operation 210, in which a current $I_{LS}$ required by the vehicle loads is estimated;

an operation 220, in which the value determined by the ratio between the power supplied by the inverter 13, $P_{outINV}$, and the battery voltage $V_{bat}$ is calculated; and an operation 230, in which a pre-set fixed value $I_F$ that enables sizing of the DC-DC converter 23 at a given value of average transferable power, i.e., the maximum value for which the converter is sized, is considered.

The steps 210, 220, 230 are carried in parallel, and their results, namely, the current values $I_{LS}$, $P_{outINV}/V_{bat}$, and $I_F$, are supplied in a step 240, which then envisages evaluation of the lowest of the three values $I_{LS}$, $P_{outINV}/V_{bat}$, and $I_F$. Then, in a step 250 an operation is selected of limitation by the DC-DC converter 23 of the output current $I_{outDCDC}$ to the lowest of the three current values $I_{LS}$, $P_{outINV}/V_{bat}$, and $I_F$; i.e., the output current is limited to the lowest of the three values.

In particular, in step 250:

if the current $I_{LS}$ required by the vehicle loads is the current of lowest value, the DC-DC converter 23 limits the output current $I_{outDCDC}$ to a value corresponding to the estimated required current $I_{LS}$. In this way, the DC-DC converter 23 supplies only part of the current necessary to the vehicle loads, while the battery 14 continues to be supplied by the smart alternator 60 at the voltage fixed by the vehicle energy-management strategy EM. This limitation guarantees the correct battery voltage $V_{bat}$ in so far as, in all situations, the charging current is managed by the alternator 60; if the current given by the ratio $P_{outINV}/V_{bat}$ is the current of lowest value, the output current $I_{outDCDC}$ of the DC-DC converter 23 is limited to the value of this ratio $P_{outINV}/V_{bat}$. In fact, in particular at low levels of input power, $P_{inDCDC}$, limitation to the estimated current $I_{LS}$ of step 210 may be excessive, causing an excessively rapid discharge of the storage element, i.e., the capacitor $C_{DC}$, and consequently a high ON-OFF switching frequency of the DC-DC converter 23. This jeopardizes the shape factor: the power is transferred in a markedly pulsed way. The behaviour in these situations is improved by introducing a limitation of the output current $I_{outDCDC}$ to the value $P_{outINV}/V_{bat}$, which imposes the minimum useful output current for complete transfer of the input power $P_{inDCDC}$. This improves the shape factor; the input power $P_{inDCDC}$ may be obtained by reading the voltage $V_{inDCDC}$ on the high-voltage bus HV and from the sum of the currents $I_{inDCDC}$ set for the four inverters 13; if the current given by the pre-set fixed value $I_F$ is the current of lowest value, the output current $I_{outDCDC}$ of the DC-DC converter 23 is limited to this value.

For each load current value there exists a critical input power $P_{inDCDC}$ that determines, in step 250, switching from one type of limitation to another.

Figure 4:
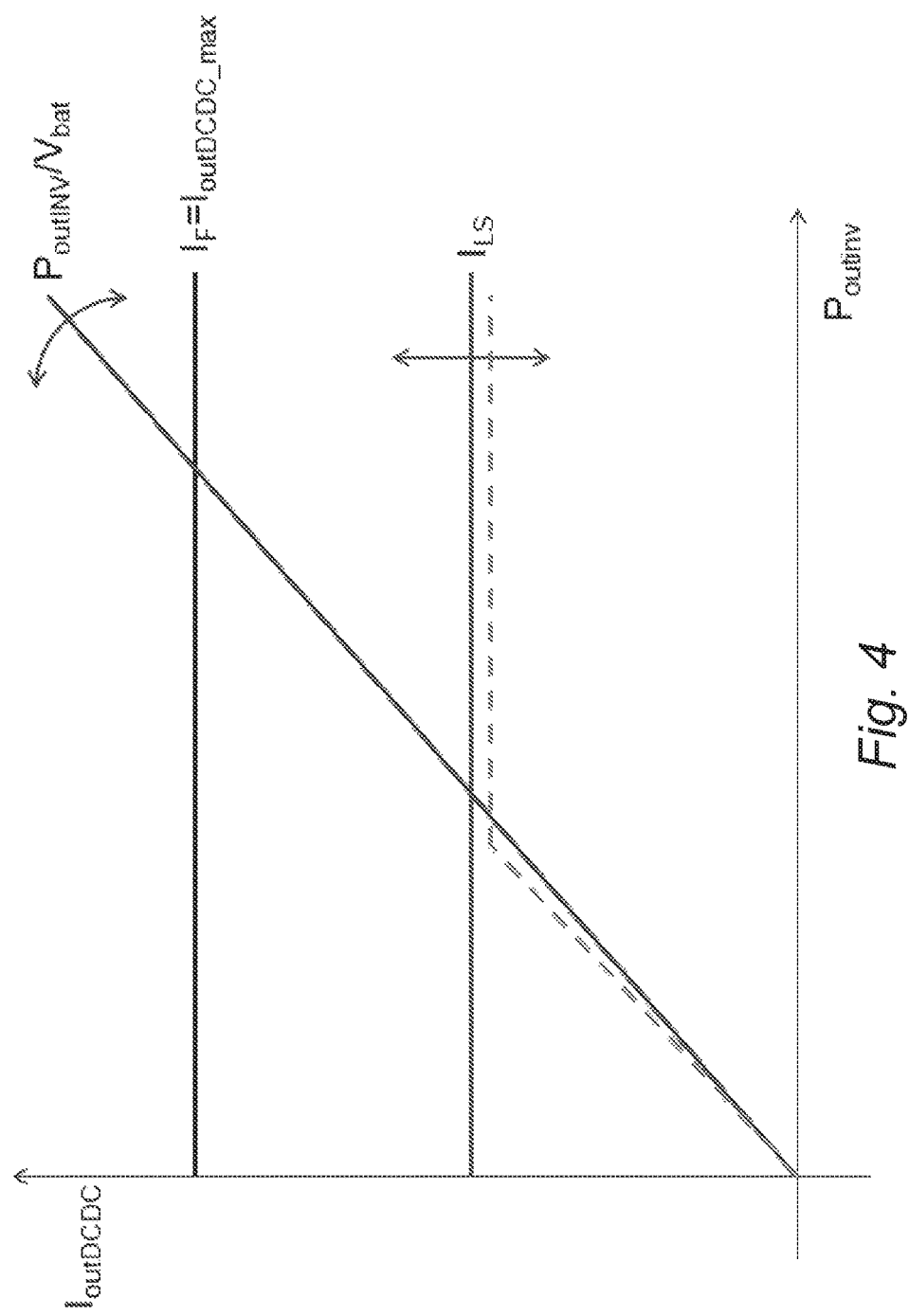
FIG. 4 shows a plot representing currents and powers used by the management method described herein.

Illustrated in FIG. 4 is the plot of the output current $I_{outDCDC}$ as a function of the output power of the inverters 13, $P_{outINV}$, for the method 100.

The curve $I_{outDCDCmax}$ (corresponding to the fixed current $I_F$) is the current limitation of the DC-DC converter 23 in the third procedure 400. It is active when the output power $P_{outinv}$ of the inverter and the current $I_{LS}$ required by the vehicle loads are high.

The curve $P_{outinv}/V_{bat}$ followed by the second procedure 300 represents the condition of equilibrium between input power and output power. Above the curve, the DC-DC converter 23 tends to supply more power than what is regenerated and will hence be periodically disabled in order to balance the average powers. Under the curve, the DC-DC converter 23 supplies less power than the input power, causing charging of the storage element $C_{DC}$ and consequent increase in the voltage on the DC-link bus.

The curve $I_{LS}$ represents the estimate of the vehicle electrical loads. Under the curve the battery is regulated by the alternator. Above the curve, the DC-DC converter 23 can contribute to charging of the battery with the risk of charging it at a voltage higher than the value set by the energy-management strategy EM (even though the DC-DC converter 23 is limited in output voltage to a value that is a little higher than that of the energy-management strategy EM).

The curves $P_{outinv}/V_{bat}$ and $I_{LS}$ vary, in the direction indicated by the arrows, as the power coming from the inverters 13 varies, as the situation of the vehicle loads varies, and moreover as the value of the battery voltage varies. These quantities are hence constantly acquired in order to set the optimal value of output current of the DC-DC converter 23. The dashed curve represents the strategy proposed.

Hence, above the critical power, the shock absorbers 12 generate a power higher than the one that it is possible to supply to the vehicle electrical system in accordance with the settings of energy-management strategy EM. These settings are, however, guaranteed by the limitation of current according to the procedure 200 just described.

Also illustrated in FIG. 3A is the detail of the second regulation procedure 300, which is preferably carried out in the case of braking and coasting, i.e., deceleration of the vehicle when power is removed, hence in the second mode 120.

In these circumstances, the energy recovered by the energy-recovery module 40 is subtracted from the energy that can be recovered from the deceleration. It is assumed to store electrical energy as much as possible and then supply it. In the latter step, the behaviour of the DC-DC converter 23 is as in the regulation procedure 200, but at a higher voltage.

Setting to a high value of battery voltage $V_{bat}$ indicates, in the example described here, the step of recovery of kinetic energy during deceleration or braking. In this situation, the DC-DC converter 23 can be temporarily disabled, and the energy is stored in the storage element $C_{DC}$. In this way, it is possible to release, at an instant subsequent to the deceleration step, the energy recovered from the shock absorbers 12, preventing it from being subtracted from the kinetic energy. Timing, i.e., the separation in time between the steps of deactivation and activation of the DC-DC converter 23, depends upon the storage capacity of the storage element $C_{DC}$. Hence, the strategy can be conveniently applied, for example, in the case of a Li-ion battery. It is envisaged to apply a voltage, for example, of 15.1 V, that is a little higher than the value of the reference voltage supplied by the energy-management strategy (e.g., 15 V) and to limit the output current to the estimated load current value $I_{LS}$, as in step 210 of the procedure 200.

Hence, with reference to the flowchart of FIG. 3A, the second regulation procedure 300 envisages, when a deceleration, in particular due to braking or coasting, that might be exploited for a procedure of recovery of kinetic energy is, for example, detected, execution, once again under the control of the control unit 70, of an operation 310 for disabling operation of the DC-DC converter 23 by storing in the storage stage 40 the energy coming from the energy-recovery stage 30. Then, after a time interval T, the length of which depends, for example, upon the storage capacity of the storage element $C_{DC}$, it is envisaged to carry out an operation of reactivation 320 of operation of the DC-DC converter 23 by transferring the energy stored in the storage stage 40.

The length of the time interval depends upon the storage capacity of the storage element $C_{DC}$ in so far as it is, for example, the time necessary for the storage element $C_{DC}$ to reach a voltage-threshold value on its own terminals, i.e., on the DC-link bus.

It should be noted that, in the case where the operation of reactivation 320 of operation of the DC-DC converter 23 is not sufficient, the additional loads are activated, as described in what follows.

As mentioned previously, in addition to the first regulation procedure 200 there is moreover envisaged a third regulation procedure 400 to be performed preferably in conditions of acceleration, with recharging disabled.

The DC-DC converter 23 can supply power to the battery 14 by regulating thereon a voltage lower than or equal to the nominal value set by the smart alternator 60 during the regulation steps on which the procedure 200 operates. In this case, particularly valorized is the contribution of the energy-recovery module 30 through the converter 23 in so far as it enables limitation of the energy deficit consequent to disabling of the smart alternator 14.

The third regulation procedure 400 envisages—by reading on the LIN a low value of battery-voltage reference $V_{bat\_ref}$ supplied by the energy-management strategy EM, for example, 11.8 V, with the aim of inhibiting charging of the battery by the smart alternator 60, for example, when occurrence of the condition of acceleration with recharging disabled is detected—execution by the DC-DC converter 23 of an operation of setting of its own output voltage at an estimated battery-voltage value $V_{bats}$. This estimated value $V_{bats}$ is estimated, for example, on the basis of the recent history of the settings, for example by calculating a mean value of the last n settings. It is possible to introduce a safety factor by setting, for example, a value of 90% of the estimate, to prevent excessive charging of the battery.

In the steps where, in the third procedure 400, the DC-DC converter 23 is disabled, i.e., the voltage on the DC-link bus is below the threshold, there obtains the regime of energy deficit, with consequent drop in the battery voltage $V_{bat}$ below the open-circuit voltage value.

Alternatively, the DC-DC converter 23 may act to implement a dedicated charging strategy, which replicates the vehicle energy-management strategies by thus acquiring the voltage, current, temperature, and battery SOC from the state-of-charge sensor. In other words, the DC-DC converter 23 processes its own energy-management strategies, substituting them for the vehicle strategies in the case where the latter consist in disabling the smart alternator 60 according to the procedure 400.

Now that the regulation procedures 200, 300, 400 have been described, a corresponding control loop implemented by the apparatus represented in FIG. 1 is described.

In general, the DC-DC converter 23 must supply current in accordance with the modalities described previously and at the same time guarantee the stability of the DC-link bus so that its voltage will be kept within a given range.

Regulation of the output is obtained via an internal current loop (which is always active) plus an external voltage loop (which is active only in certain operating modes). Limitations of maximum current and voltage are present in all of the modes.

Figure 5:
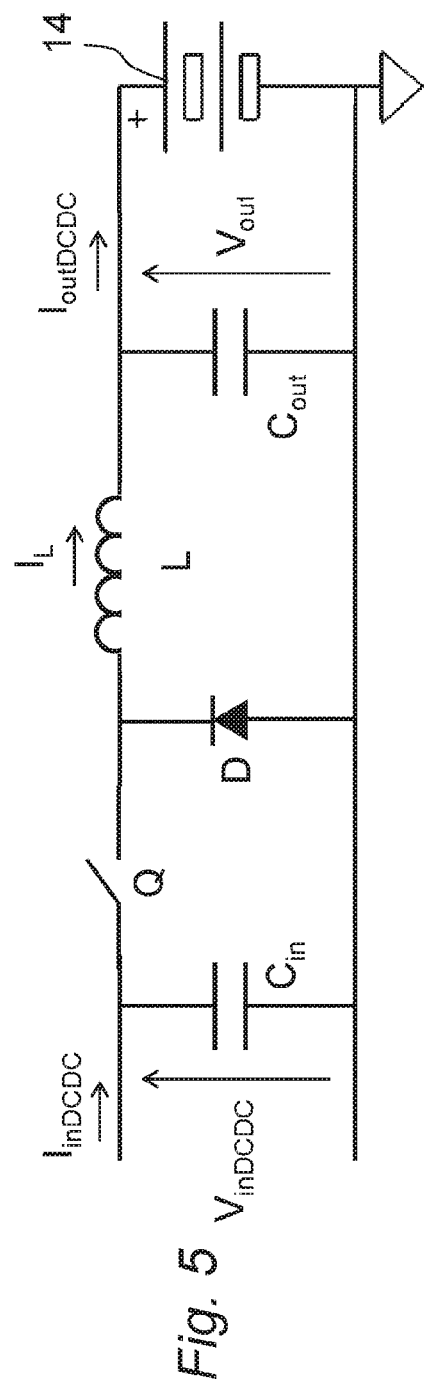
FIG. 5 is a schematic illustration of an example of DC-DC converter used by the apparatus described herein.

FIG. 5 is a more detailed circuit diagram of an example of a converter 23 of a buck type.

The DC-DC converter 23 comprises an input capacitance $C_{in}$, connected between the terminal where the input current $I_{inDCDC}$ enters and ground. The input capacitance $C_{in}$ can be separated from the storage element $C_{DC}$ by a filter. Present on said input capacitance $C_{in}$ is the input voltage drop $V_{inDCDC}$. A switch Q in series separates the input terminal of the converter 23 from a diode D, set between the switch Q and ground, with the anode connected to ground. Connected to the cathode of the diode D is an input terminal of a storage and filtering inductor L, through which the inductor current $I_L$ flows. Connected between the output terminal of the inductor L and ground is an output capacitor $C_{out}$, in parallel with the battery 14, which receives the current at output from the output terminal $I_{outDCDC}$, and the output voltage $V_{outDCDC}$ present on the output terminal itself. The output capacitor $C_{out}$ can alternatively be separated from the battery 14 by a filter.

Figure 6:
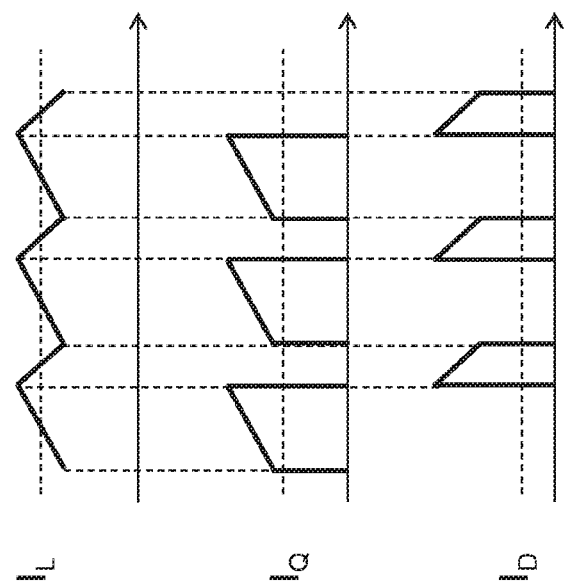
FIG. 6 illustrates plots of currents in the converter of FIG. 5.

Shown in FIG. 6 are the currents $I_Q$, $I_L$, $I_D$ in the switch Q, in the inductor L, and in the diode D during the states of closing (current $I_Q$ higher than zero) and opening of the switch Q. By varying these states, regulation in current of the internal loop of the DC-DC converter is obtained, which hence enables implementation of the regulation procedures 200, 300, 400.

Figure 7:
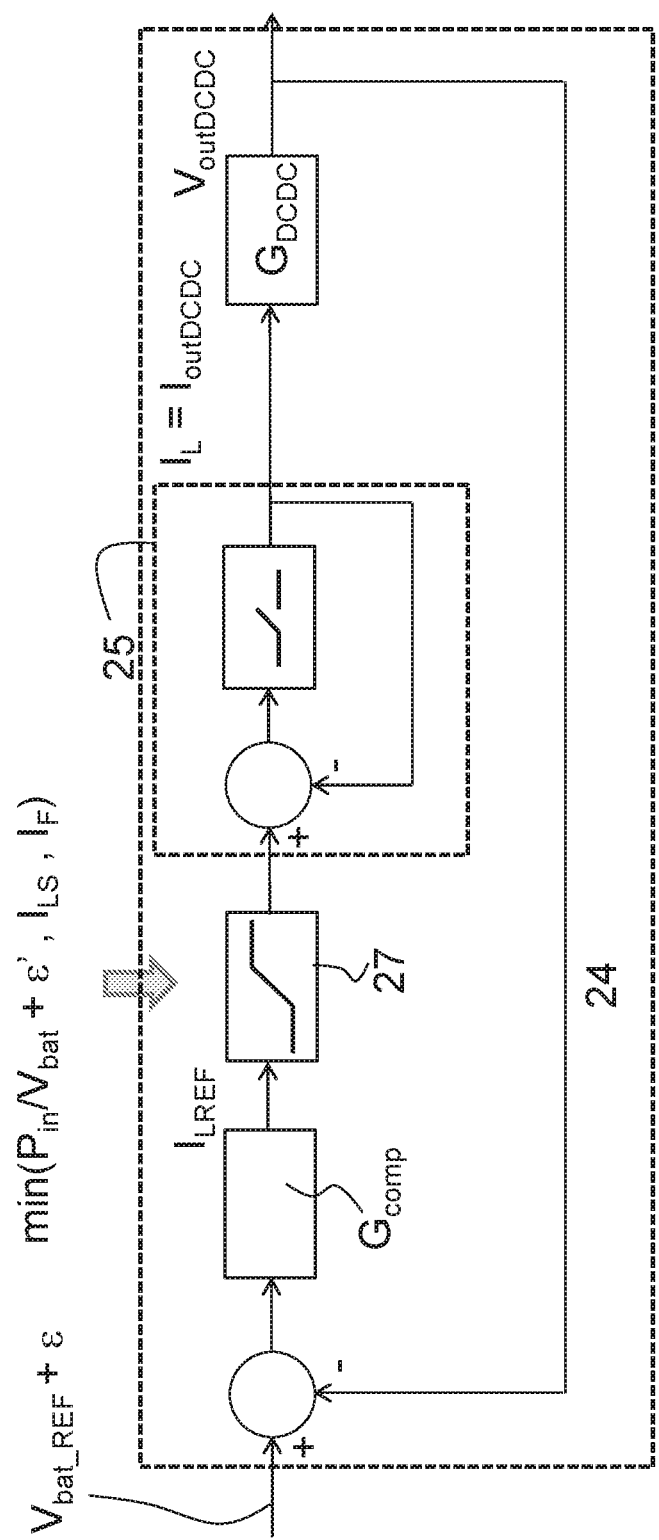
FIG. 7 is a block diagram of an embodiment of the control loop implemented by the apparatus described.

FIG. 7 shows a block diagram of the control loop implemented by the apparatus according to the invention, for the first regulation procedure 200. This control loop is implemented in a control module, which preferably resides in the DC-DC converter 23.

The battery-voltage reference value $V_{bat\_ref}$ set by the energy-management strategy EM in the control unit 70 according to the first, normal, mode (the one that activates the procedure 200), increased by an amount ε, is sent to an adder node of the voltage loop, which calculates the error between the battery-voltage reference value $V_{bat\_ref}$ increased by an amount ε and the output voltage $V_{DCDC}$ in the outer regulation loop 24.

This error is supplied to a compensation network with gain $G_{comp}$, which carries out amplification and compensation in order to generate a current reference in the inductor $I_{LREF}$ as reference signal for an internal loop 25, obtained with cycle-by-cycle modulation techniques, which is, for example, hysteretic, of the peak-current-mode type, or of some other type, which is aimed at regulating the current $I_L$ that flows in the inductor L, limiting in practice the output current $I_{outDCDC}$.

This current in the inductor $I_L$ results in fact in an output voltage $V_{outDCDC}$ according to a transfer function $G_{DCDC}$ of the converter 23, the form of which hence depends upon the topology of converter used. In the case exemplified, this is a topology of a buck type.

Set between the compensation network $G_{comp}$ and the current loop is a block 27 in which the minimum value is determined according to the operation 240 and the output current limit value is selected from $P_{in}/V_{bat}+ε'$, where the quantity ε' is a respective current increase, $I_{LS}$, and $I_F$, this value then being supplied to the inner current loop 25.

So far it has been described how the DC-DC converter carries out regulations of its own voltage and current at output, in response to different settings of battery-charge voltage defined by the energy-management strategies.

There now follows a description, instead, of a main aspect of the solution disclosed herein, regarding a procedure for regulating the voltage $V_{inDCDC}$ on the DC-link bus, i.e., the voltage on the storage element $C_{DC}$, which is set, instead, at the input of the DC-DC converter.

The above voltage $V_{inDCDC}$ is preferably regulated according to a hysteretic mode.

Figure 8B:
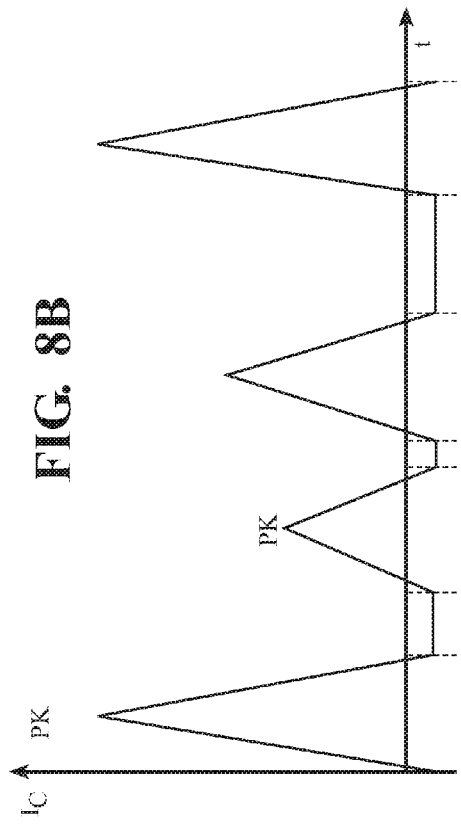
FIG. 8B details the energy-storage system and the signals that are formed therein.
Figure 8C:
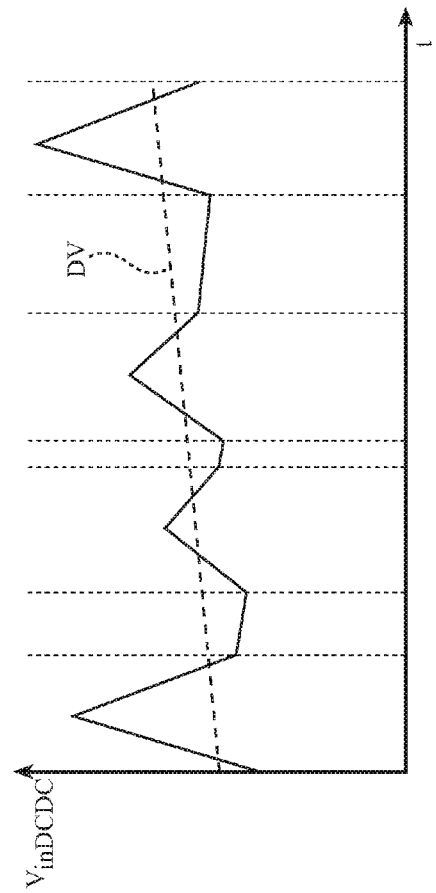
FIG. 8C details the energy-storage system and the signals that are formed therein.
Figure 8A:
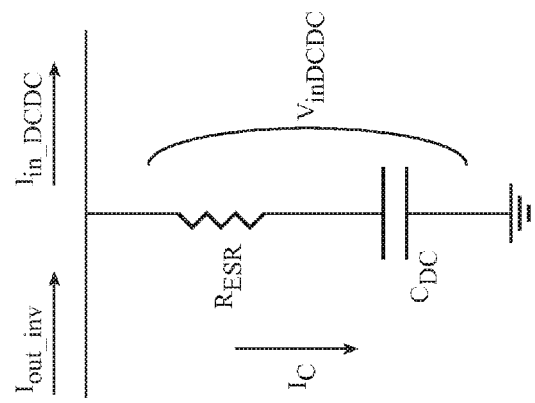
FIG. 8A details the energy-storage system and the signals that are formed therein.

In order to understand the problems of control of the input voltage of the converter and on the DC-link bus, already mentioned previously, the storage element $C_{DC}$ is represented schematically in FIG. 8A and includes a series resistance $R_{ESR}$ of its own. Appearing alongside, in FIGS. 8B and 8C are, respectively:

the plot in time t of the current $I_c$ in the storage element $C_{DC}$, which is equal to the difference between the total current $I_{outinv}$ of the inverter or inverters 13, as in FIG. 1, on the high-voltage bus HV, and the current $I_{inDCDC}$ at input to the converter 23; and the plot in time t of the voltage drop on the storage element $C_{DC}$ that includes the series resistance $R_{ESR}$, which corresponds to the input voltage $V_{inDCDC}$ of the converter 23.

The total current $I_{outINV}$ coming from the inverters 13 has a markedly pulsed nature on account of the damping control strategy. The voltage on the high-voltage bus HV, or DC-link bus, reflects this behaviour, and may present of the overvoltages. These overvoltages are of two types:

peaks PK due to the drop on the series resistance $R_{ESR}$; and progressive rise in the mean voltage (a growing voltage drift DV represented by a dashed straight line in FIG. 8C) due to the unbalancing between the output current $I_{outinv}$ coming from the inverters 13 and current $I_{inDCDC}$ at input to the DC-DC converter 23.

Figure 12:
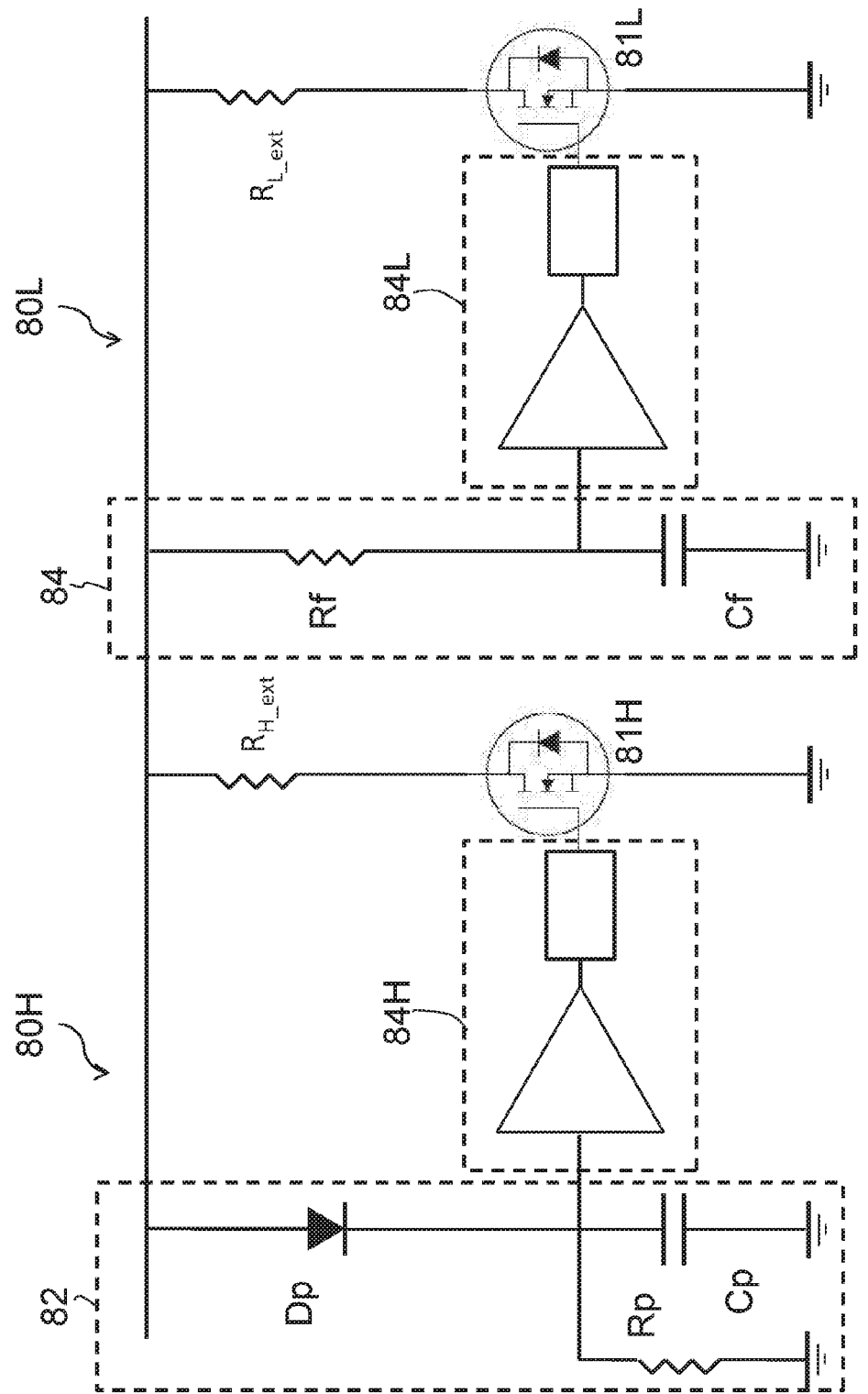
FIG. 12 illustrates a circuit detail of an additional load circuit used in the solution of FIG. 9.

In order to overcome these problems, represented in FIG. 12 is a circuit diagram of part of the circuit regarding the side of the high-voltage bus HV. The energy-recovery stage 30 is represented schematically by a current generator that sends the output current $I_{outINV}$ of the stage 30, i.e., the output current of the inverters 13. A portion $I_C$ of the output current $I_{outINV}$ flows in the storage element $C_{DC}$, i.e., the capacitor. The drop on the storage element $C_{DC}$ corresponds to the voltage $V_{DC}$ link of the high-voltage bus.

There is also envisaged, according to the solution described herein, an additional load, i.e., a dissipative element, designated by $R_{ext}$, in parallel with the storage element $C_{DC}$. The dissipative element $R_{ext}$ is connected to ground through a switch $B_{ext}$ controlled by an external threshold value, $S_{ext}$, of the bus voltage $V_{DClink}$. As described more fully in what follows, the external threshold value, $S_{ext}$, is of the type with hysteresis; i.e., it corresponds to an upper threshold $S_{ext1}$ and a lower threshold $S_{ext2}$. Connected downstream of the dissipative element $R_{ext}$ is the DC-DC converter 23, which, in the model of FIG. 12, is also connected to the DC-link bus through a switch $B_{DCDC}$, controlled by a threshold value of the bus voltage $V_{DClink}$ proper to the converter, $S_{DCDC}$. As described more fully in what follows, the converter threshold value $S_{DCDC}$ is of the type with hysteresis; i.e., it corresponds to an upper threshold $S_{DCDC1}$ and a lower threshold $S_{DCDC2}$. The switch $B_{DCDC}$ is in effect here represented as a physical switch, but it is preferably a virtual switch, which is implemented by switching on and switching off the DC-DC converter 23.

Figure 2:
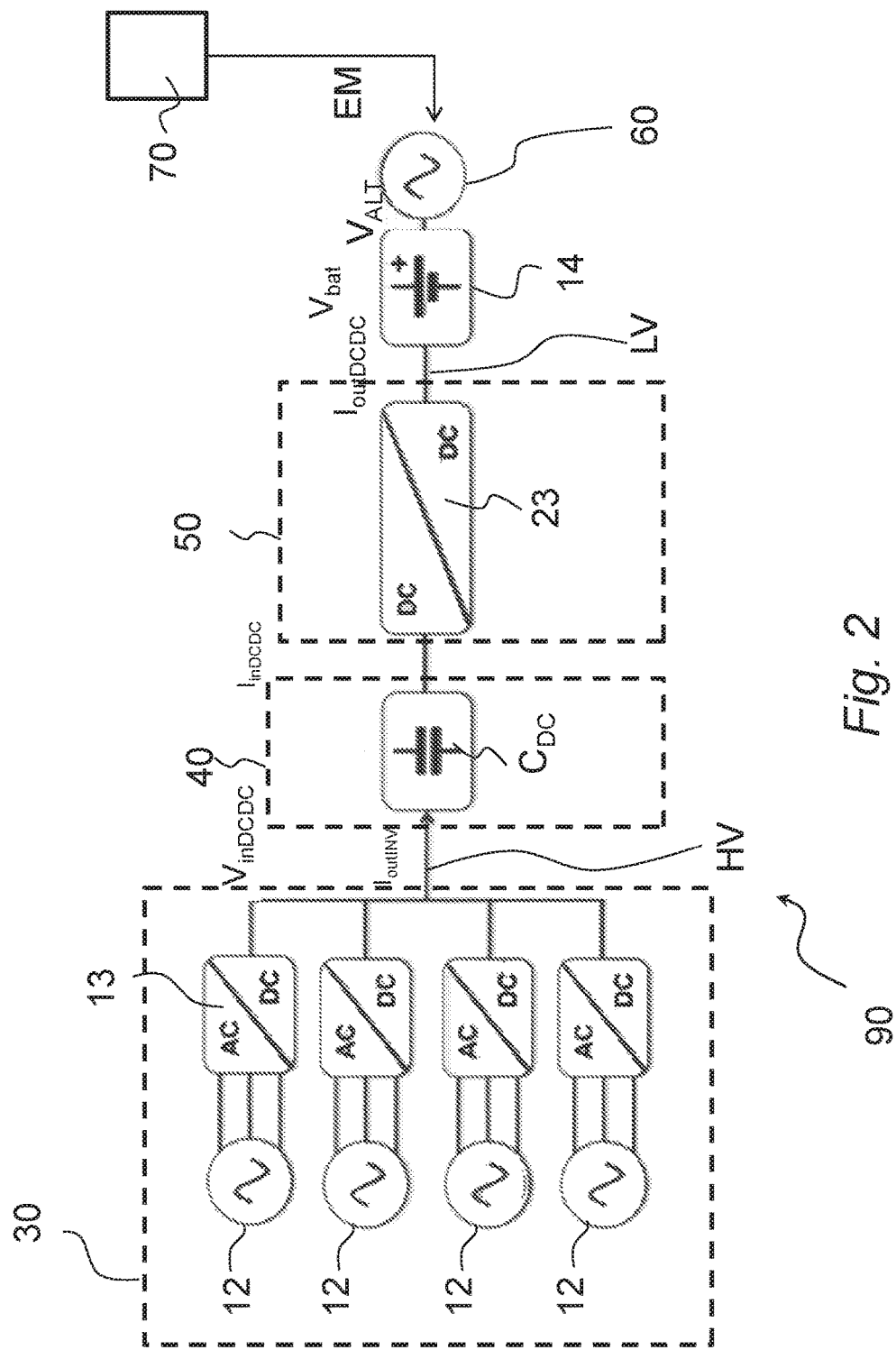
FIG. 2 is an apparatus for managing the charge of a battery.
Figure 9:
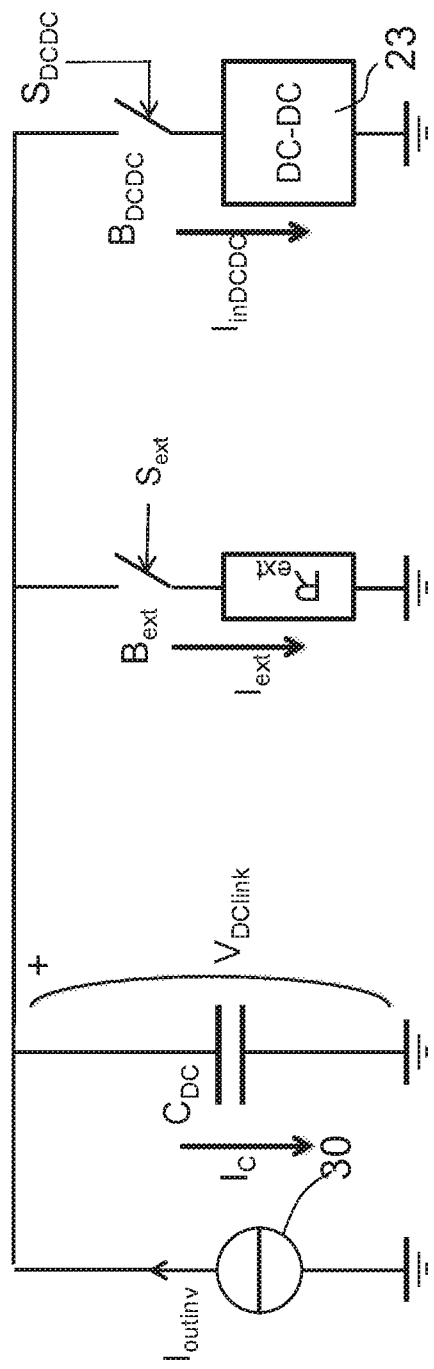
FIG. 9 illustrates a circuit diagram of the high-voltage portion of a variant embodiment of the apparatus described herein.
Figure 10:
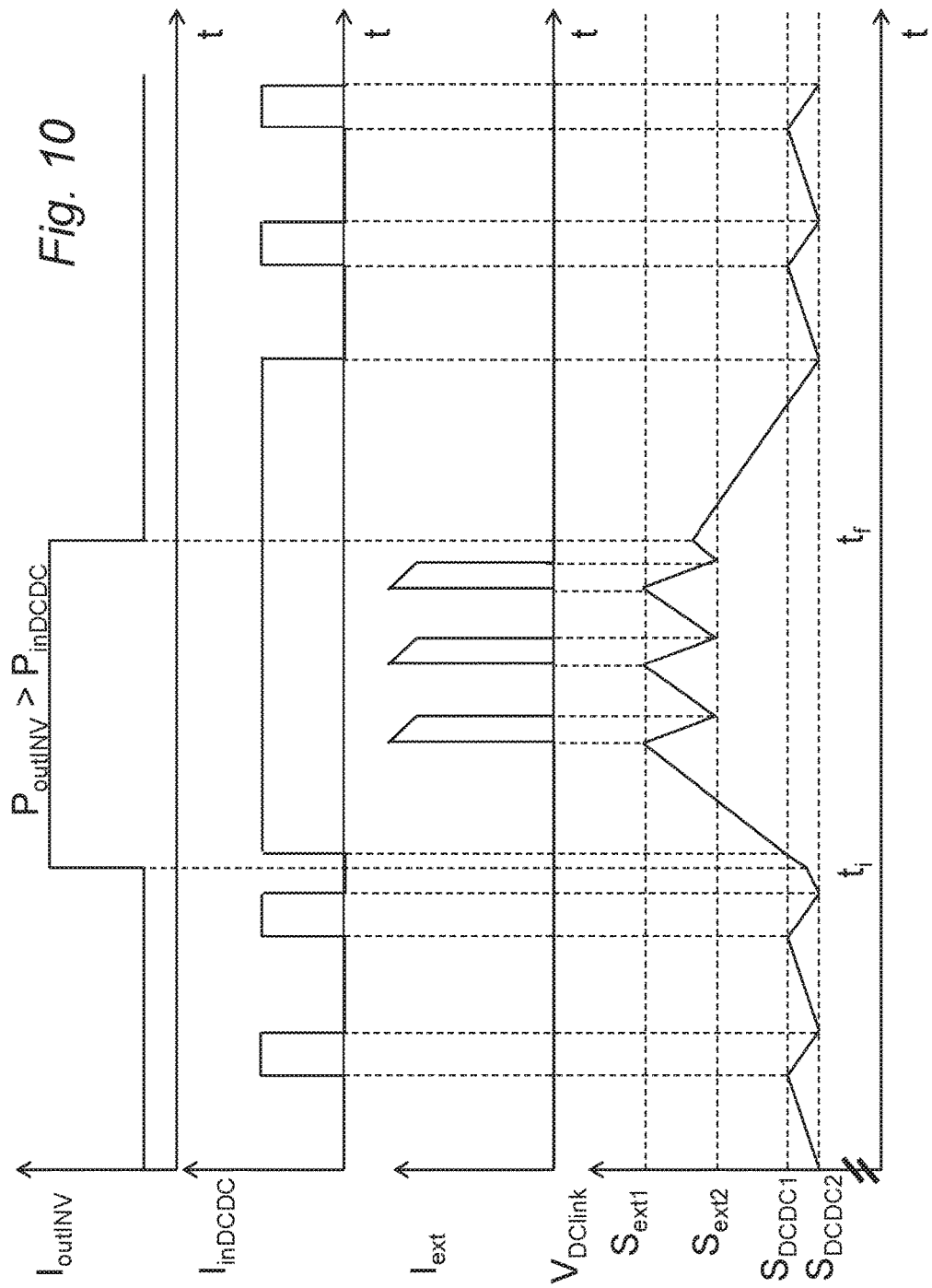
FIG. 10 illustrates control signals and signals that are formed in the apparatus of FIG. 9.
Figure 11:
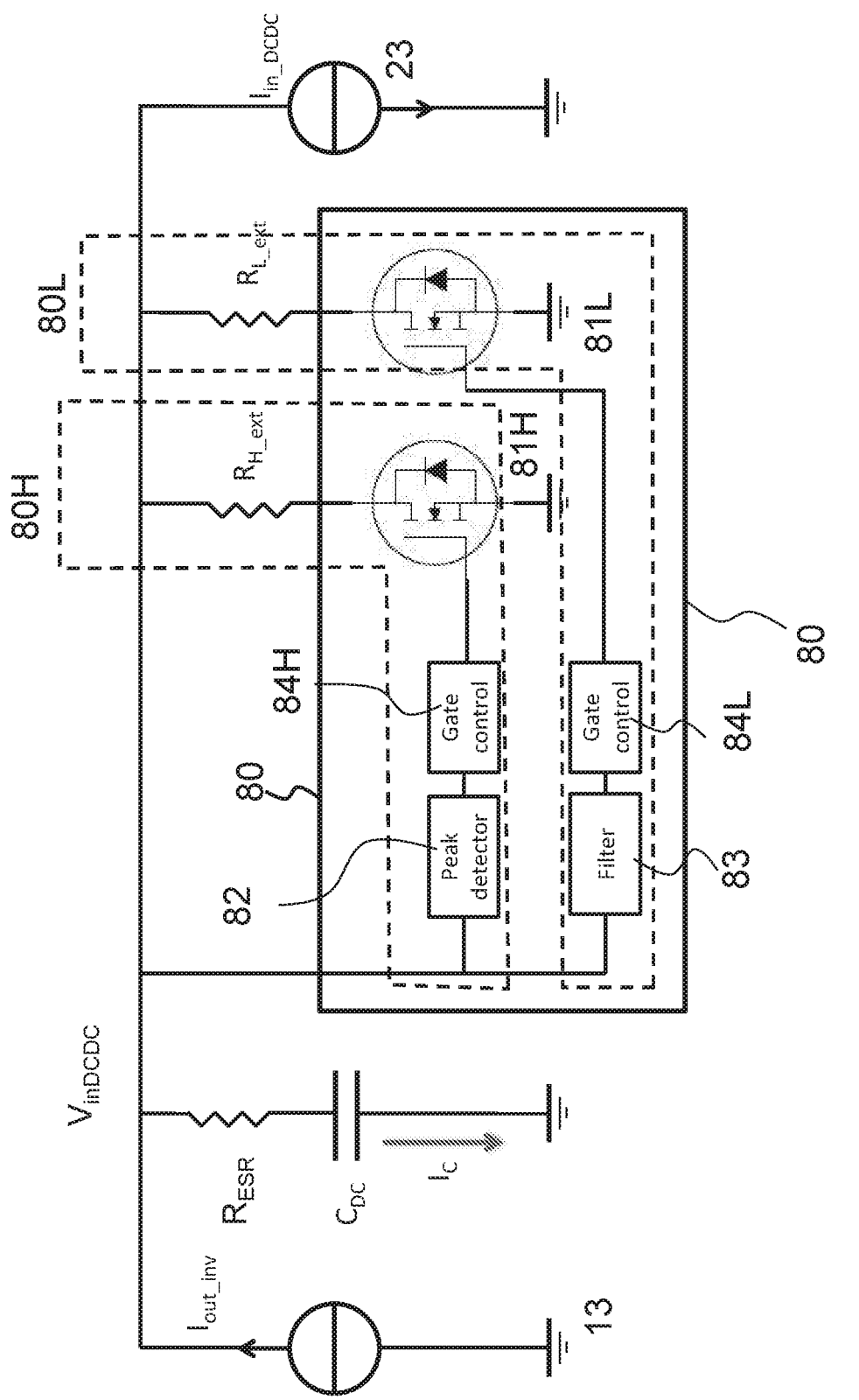
FIG. 11 is a schematic illustration of an additional load circuit used in the solution of FIG. 9.

It is emphasised that in general the circuit of FIG. 9 is an alternative schematic representation of the circuit of FIG. 2, in particular regarding the circuit region of the high-voltage bus and of the converter 23. The dissipative element $R_{ext}$ in FIG. 2 is not represented, but it may equally be present also in the diagram of FIG. 2. As illustrated in greater detail in what follows, the energy-management apparatus implements a method for managing the battery charge, which envisages control of the voltage on the DC-link as illustrated in what follows, i.e., via a first hysteretic procedure when the power $P_{outINV}$, due to the regenerative shock absorber 12, is lower than the absorbable power, which is a function of the power that can be supplied by the DC-DC converter 23, and via a second hysteretic procedure, which uses the resistance $R_{ext}$ when the power $P_{outINV}$, due to the regenerative shock absorber 12, is higher than the power that can be absorbed by the DC-DC converter 23. The output current of the converter is moreover regulated according to the regulation procedures 200, 300, 400 described previously in response to the regulations of the alternator.

The voltage on the storage element $C_{DC}$ is regulated in hysteretic mode, as described in what follows.

The output current of the stage 30, $I_{outinv}$, which is a function of the damping regulation, tends to cause the bus voltage $V_{DClink}$ to rise.

The input current $I_{inDCDC}$, the value of which is a function, through the regulation procedures 200, 300, 400, of the energy-management strategies, tends to cause the voltage $V_{DClink}$ to drop.

It is hence envisaged to set the external threshold value $S_{ext}$ at a voltage value higher than the threshold value $S_{DCDC}$ of the converter 23, for example, at 53 V and 49 V, respectively. In this way, as the bus voltage $V_{DC}$ link increases, first the DC-DC converter 23 is enabled and then, in the case where the voltage continues to rise, the external load $R_{ext}$ is enabled. Instead, as the bus voltage $V_{DClink}$ decreases, first the external load $R_{ext}$ is disabled and, in the case where the voltage continues to drop, the DC-DC converter 23 is disabled.

The switch $B_{DCDC}$ for the DC-DC converter 23, represented in FIG. 12 in a purely functional way, may for example be a controlled switch, obtained via a MOSFET, or else, preferably, it may be the control of the converter 23 that carries out activation/deactivation of the DC-DC converter 23 itself.

According to the solution described herein, two cases are envisaged.

In the first case, the power $P_{outINV}$, due to the regenerative shock absorber 12, is lower than the absorbable power by the DC-DC converter 23.

In this case, the storage capacitor $C_{DC}$ is hence charged/discharged by the difference between the power $P_{outINV}$ generated by the inverter 13 and the power absorbed by the DC-DC converter 23. The power $P_{outINV}$ due to the regenerative shock absorber 12 and generated at output the inverter 13 is dictated by the workpoint on the damping characteristics of the system of regenerative shock absorbers 12. Hence, it cannot be modified or otherwise modulated. The power absorbed by the DC-DC converter 23 can be modulated via cycles of activation and deactivation of the DC-DC converter 23 according to a hysteretic law, which may be based upon the voltage, in the case where, for example, the storage element $C_{DC}$ is obtained through chains of supercapacitors (or supercaps), or else or upon the SOC in the case of a battery 14 of Li-ion type or of other technology.

The maximum power that can be supplied by the DC-DC converter 23 to the battery 14 or the low-voltage bus LV is limited by the regulation procedures 200, 300, or 400 according to the signals of the energy-management module or by the maximum output current of the DC-DC converter 23. In either case, if the power $P_{outINV}$ supplied by the energy-recovery system 30, in particular by the inverter 13, is lower than the power that can be absorbed by the DC-DC converter 23, the system guarantees total transfer of the recovered energy, varying only the working duty-cycle according to the limitation-current value.

The DC-DC converter 23 may hence conveniently be sized in power so as to guarantee the above operating mode with reference to a most likely value of maximum input power.

In the case, instead, where the power $P_{outINV}$ is higher than the power that can be absorbed by the DC-DC converter 23, the current absorbed by the DC-DC converter 23 is not able to discharge the high-voltage bus HV. This may occur on account of the limitation of the output current, which is determined by the energy-management requirements or else is absolute, i.e., the maximum current that the DC-DC converter 23 is able to supply.

According to a further aspect of the solution described herein, an additional dissipative load is in this case provided on the high-voltage bus HV itself, as illustrated in FIG. 12. Since, as has been said, the power coming from the inverters 13 cannot be modified or manipulated, the DC-DC converter 23 is in this case always enabled, with a current limitation, whereas the additional load can be modulated according to a further hysteretic law based upon the voltage of the DC-link (supercaps) or upon the SOC (in the case of a battery of the Li-ion type or of other technology).

The level of the voltage, as likewise the corresponding ripple, can be varied to keep the storage element $C_{DC}$ charged (higher voltage), enabling recovery of the energy previously stored at a moment allowed by the energy-management strategy EM, or else to keep it discharged (lower voltage) in order to enable a higher level of storage.

Figure 13:
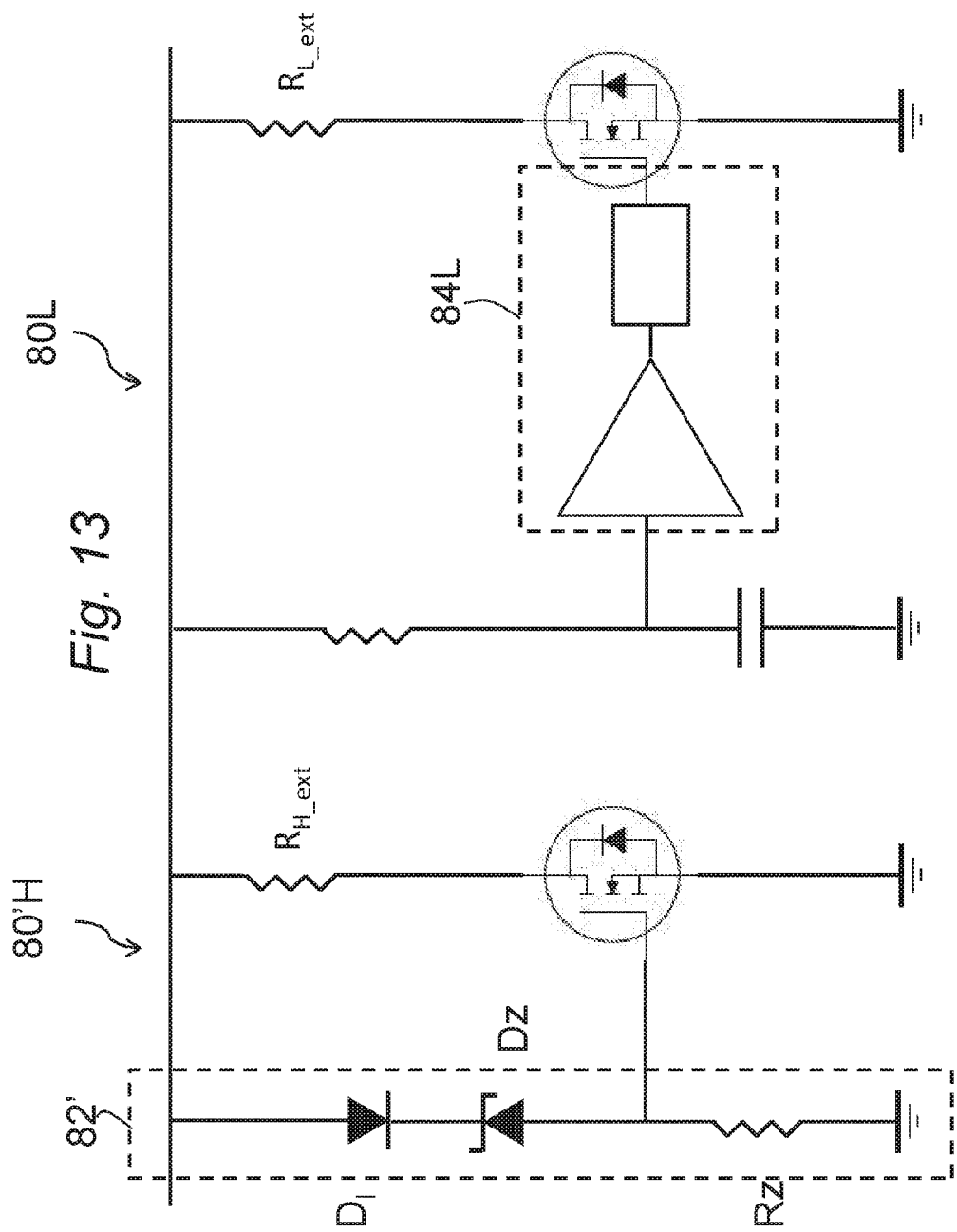
FIG. 13 illustrates a circuit detail of a variant embodiment of the additional load circuit used in the solution of FIG. 9.

Illustrated, instead, in FIG. 13 are diagrams that represent, respectively, the plots in time t of the output current $I_{outINV}$ of the stage 30, of the input current $I_{inDCDC}$ of the converter 23, of the current $I_{ext}$ in the external dissipative element $R_{ext}$, and of the voltage $V_{DClink}$ on the high-voltage bus.

As may be noted, as long as the output current $I_{outINV}$, supplied by the inverters 13, remains at a low level, indicating a low recovery, and hence with a power $P_{outINV}$ lower than the power of the converter 23, the voltage $V_{DC}$ link is regulated via cycles of activation and deactivation of the converter 23, represented by high and low values of input current $I_{inDCDC}$ of the DC-DC converter 23. The voltage $V_{DC}$ link remains limited by applying a control procedure of a hysteretic type comprising an operation of threshold comparison with hysteresis of the second voltage value ($V_{inDCDC}$) with an upper threshold value $S_{DCDC1}$ and a lower threshold value $S_{DCDC2}$, the values of which depend upon the voltage that it is desired to have at output from the DC-DC converter 23 according to the operating mode.

When, at a time ti, the output current $I_{outINV}$ passes to a higher level, representing an output power $P_{outINV}$ generated by the stage 30 higher than the power of the converter 23, the current $I_{inDCDC}$ remains fixed at a maximum value, and, whenever the bus voltage $V_{DClink}$ exceeds the external upper threshold $S_{ext1}$, the switch $B_{ext}$ closes, bringing about passage of a current $I_{ext}$ and decrease of the voltage $V_{DC}$ link. When this voltage reaches the external lower threshold $S_{ext2}$ of the converter 23, the external switch $B_{ext}$ opens, and the current $I_{ext}$ in the external dissipative element $R_{ext}$ ceases to flow.

When, at a time $t_f$, the output current $I_{outINV}$ returns to a low level indicating an output power $P_{outINV}$ lower than the power absorbed by the converter $P_{inDCDC}$, which is at a higher level, the circuit returns to the first hysteretic control mode, with simple activation and deactivation of just the converter 23 in order to remain below the threshold $S_{DCDC1}$ established by the energy-management strategy EM.

The method for managing the energy supplied to a low-voltage system of a motor vehicle described herein comprises, in the case of an output power $P_{outINV}$ supplied by the energy-recovery system 30 higher than the power that can be absorbed by the DC-DC converter 23, providing as dissipative element $R_{ext}$ an additional load circuit 80, connected in parallel between the high-voltage bus HV and ground. This additional load circuit comprises two tripping circuits for the two types of overvoltage; namely:

a first circuit 80H for activation of a high-power load with fast activation/deactivation, with high triggering threshold (close to the maximum voltage acceptable on the high-voltage bus HV, for chopping the peaks), for example, an impulsive power load. By "fast activation" it is meant that the first activation circuit 80H must have a time constant sufficient to follow the peaks PK of the high voltage, i.e., comparable with the time constant associated to the peaks PK of the high voltage; in particular, the activation must be fast and hence must be based upon an instantaneous reading of the voltage, such as the one that can be obtained via a peak detector; and a second circuit 80L for activation of a low-power load with slow activation/deactivation, with a threshold around the nominal voltage of the high-voltage bus HV and possibly variable, with the aim of keeping the mean voltage of the high-voltage bus HV at the desired value even in the presence of power unbalancing ($I_{outINV} > I_{in\_DCDC}$). For instance, it may be a medium-power load with slow activation. By "slow activation" it is meant that the second activation circuit 80L has a time constant such as to follow the increase of the mean value, i.e., the voltage drift DV indicated in FIG. 8C, i.e., a time constant comparable to the time constant associated to the increase of the mean value; for this type of regulation, a filtered reading of the voltage becomes necessary.

It should be noted that, in variant embodiments, the additional load circuit may comprise only the first activation circuit 80H or the second activation circuit 80L.

As illustrated in FIG. 12, the circuit 80 comprises a fast-activation branch 80H, which includes a peak detector 82 and a circuit 84H for control of the gate of a MOS 81H, the drain of which is connected, via a fast-circuit resistor $R_{H\_ext}$, to the high-voltage bus HV, whereas the source electrode is at ground. When the gate-control circuit 84H, on the basis of the value detected by the peak detector 82, detects that the input voltage $V_{inDCDC}$ of the converter 23 is above a given threshold, for example, the external upper threshold $S_{ext1}$, it activates the gate of the MOS 81H to close the MOS 81H, which substantially operates as switch so that the fast-circuit resistor $R_{H\_ext}$ connected between the high-voltage bus HV and ground operates as dissipative load for the excess power.

Moreover, the circuit 80 comprises a slow-activation branch 80L, which includes a filter 83 and a circuit 84L for control of the gate of a MOS 81L, the drain of which is connected via a slow-circuit resistor $R_{L\_ext}$, to the high-voltage bus HV, whereas the source electrode is at ground. The filter 83 carries out filtered reading of the input voltage $V_{inDCDC}$ of the converter 23.

When the gate-control circuit 84L, on the basis of the value filtered by the filter 83, detects that the input voltage $V_{inDCDC}$ of the converter 23 is above a given threshold, for example, the external lower threshold $S_{ext2}$ that is a little higher than the nominal voltage and much lower than the threshold of the circuit 80H, it activates the gate of the MOS 81L to close the MOS 81L, which substantially operates as switch so that the resistor $R_{L\_ext}$ connected between the high-voltage bus HV and ground operates as dissipative load for the excess power.

FIG. 12 illustrates a circuit detail of the additional circuit 80, which shows the peak detector 82 of the high-voltage circuit 80H, comprising a diode Dp, the anode of which is connected to the high-voltage bus HV and the cathode of which is connected to the input of the gate-control module 84H, i.e., to the input of a comparator 831, to evaluate whether the voltage on the anode of the diode Dp is higher than a given threshold. Connected to the input of the comparator 831 are a capacitance Cp towards ground and a resistance Rp in parallel thereto. The comparator 831 is connected to a gate driver 832, which supplies the current for driving the gate electrode of the MOS 81H.

The slow-activation circuit 80L is similar to the fast-activation circuit 80H, but comprises an RC filter, including a resistor $R_f$, which is connected to the high-voltage bus HV and is set in series with a filter capacitor $C_f$, which is in turn connected to ground. Connected between the resistor $R_f$ and the capacitor $C_f$, where a voltage filtered with respect to the input voltage $V_{inDCDC}$ is set up, is the input of the gate-control module 84L.

The aim is to dissipate the excess power on loads external to the DC-DC converter 23 so as to minimise thermal sizing thereof, whence the preference for a PWM (Pulse Width Modulation) control for the additional loads.

In addition to the solution of FIG. 12, also possible is a mixed control solution, for example, with MOSFETs that drive the external loads in linear mode, in particular for the circuit 80H. In this regard, illustrated in FIG. 13 is a variant in which, instead of the peak detector 82 and the gate control module 84H, a circuit 82' is provided, which comprises a diode Dl, connected with its anode to the high-voltage bus HV and with its cathode to the cathode of a Zener diode Dz. The anode of the Zener diode Dz is connected, through a resistor $R_z$, to ground and to the gate of the MOS 81H. When the input voltage exceeds the breakdown voltage of the Zener diode Dz, the MOS 81H enters into conduction, activating the fast-activation load $R_{H\_ext}$.

To contain the size of the additional load 80 it is possible to activate vehicle loads that are typically slow, for example, the heated rear window after previously checking that the consequent raised current limitation for the current loads is lower than the absolute one: otherwise, energy (supplied by the alternator) is wasted.

Hence, from the foregoing description, the advantages of the present solution emerge clearly.

Advantageously, the apparatus and method described additionally enable management of the cases where the power supplied by the energy-recovery stage is higher than the power supplied at output by the DC-DC converter.

Furthermore, the apparatus and method described enable control of the vehicle low-voltage bus in the presence of a number of power-generating devices, such as an alternator and regenerative shock absorbers, in accordance with the existing energy-management strategies, in particular with the voltage set by the smart alternator.

Furthermore, the apparatus and method described enable operation of the DC-DC converter so as to regulate the output current (and voltage) and the input voltage simultaneously.

In addition, the apparatus and method described enable operation in the cases where the battery-voltage set point is not available, as in the case of the classic alternator or of a smart alternator during acceleration.

Moreover, the apparatus and method described additionally enable handling of the cases where the power supplied by the energy-recovery stage is higher than the absorbable power at output from the DC-DC converter.

Of course, without prejudice to the principle of the invention, the details of construction and the embodiments may vary widely with respect to what has been described and illustrated herein purely by way of example, without thereby departing from the scope of the present invention.

For instance, the energy-recovery system, instead of or together with the regenerative shock absorbers may comprise regenerative brakes.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An apparatus for managing the energy supplied to a low-voltage system of a vehicle that comprises an energy-recovery stage,
    said low-voltage system, which operates at a first voltage, including:
        a battery, which supplies said first voltage on a low-voltage bus;
        a system for charging the battery, comprising an alternator for supplying a charging voltage to said battery; and
        vehicle loads supplied by the battery and/or by the alternator,
    said vehicle comprising a high-voltage system, which operates at a second voltage higher than said first voltage, said system comprising said vehicle energy-recovery stage, which supplies said second voltage,
    said second voltage being supplied through an intermediate energy-storage system to a DC-DC converter, which converts said second voltage into said first voltage on said low-voltage bus,
    said apparatus comprising a control module that performs energy-management operations at least by the alternator,
    the second voltage of said DC-DC converter being regulated via a control procedure of a hysteretic type comprising an operation of threshold comparison with hysteresis of the value of said second voltage, and an operation of activation or deactivation of said DC-DC converter on the basis of the result of said comparison operation,
    wherein said management apparatus comprises an additional load, which is set in parallel with the input of the DC-DC converter and can be selectively connected to the high-voltage bus; and
    if the power supplied by the energy-recovery stage is higher than a power absorbed by the DC-DC converter, said management apparatus keeps the DC-DC converter always activated, with a current limitation, and for selecting the connection of the additional load according to a further hysteretic control procedure, in particular based upon the second voltage or upon a state of charge,
    said further hysteretic control procedure comprising respective thresholds for the additional load and for the converter and envisages setting the threshold value that controls selective connection of the additional load to the high-voltage bus at a voltage value higher than the threshold value of activation of the converter, so that, as the second voltage increases, first the DC-DC converter is activated and then, in the case where the voltage continues to rise, the additional load is activated and, instead, as the second voltage decreases, first the additional load is deactivated and, in the case where the second voltage continues to drop, the DC-DC converter is deactivated.

2. The apparatus as set forth in claim 1, wherein said apparatus comprises an additional load circuit connected in parallel between the high-voltage bus and ground, which comprises a first circuit for activation of a faster-activation load, with higher triggering threshold and/or a second activation circuit of a slower-activation load, with a threshold higher than the second nominal voltage of the high-voltage bus and lower than said higher triggering threshold.

3. The apparatus as set forth in claim 1, wherein:
    said apparatus detects information on the regulated voltage in order to detect the operating mode of the alternator; and
    said control module carries out energy-management operations at least by the alternator regulates a voltage of the battery at a nominal operating value,
    upon detection of said first operating mode, the apparatus carries out a procedure of regulation of the DC-DC converter, comprising:
        an operation, in which a current required by the vehicle loads is estimated;
        an operation, in which the value of current determined by the ratio between the power supplied by the energy-recovery stage and the battery voltage is calculated;
        an operation, in which a pre-set fixed current value that enables sizing of the DC-DC converter at a given value of average transferable power is considered;
        an operation of evaluating the lowest of said three values, namely, the estimated required current, the current value determined by the ratio, and the pre-set fixed current value; and
        an operation of limitation by the DC-DC converter of the output current to the lowest of said three values, namely, the estimated required current, the current value determined by the ratio, and the pre-set fixed current value.

4. The apparatus as set forth in claim 1, wherein said apparatus comprises a control module that carries out energy-management operations at least by the alternator, which supplies, as information on the regulated voltage, a battery-voltage reference.

5. The apparatus as set forth in claim 1, wherein said control module carries out management of the energy by the alternator, comprising a second operating mode in which the alternator regulates the voltage of the battery at a battery-voltage value increased with respect to the second nominal voltage, and, if said second operating mode is detected, the apparatus carries out a procedure of regulation of the DC-DC converter, comprising:

an operation for disabling operation of the DC-DC converter by storing in the intermediate energy-storage system the energy coming from the energy-recovery stage; and after a given time interval, in particular a time interval necessary for a storage element of the intermediate energy-storage system to reach a voltage-threshold value on its terminals, carrying out an operation of reactivation of operation of the DC-DC converter by transferring the energy stored in the intermediate energy-storage system.

6. The apparatus as set forth in claim 1, wherein said control module carries out management of the energy by the alternator, comprising a third operating mode in which the alternator operates for regulating the battery voltage at a value lower than the first nominal voltage, and the apparatus carries out a procedure of regulation of the DC-DC converter, comprising supplying power to the battery by regulating a voltage lower than or equal to the value of the first nominal voltage, in particular by carrying out an operation of setting a battery-voltage value estimated on the basis of the recent history of the settings.

7. The apparatus as set forth in claim 1, wherein said operation of detection of said first, second, or third operating mode comprises detection of a battery-voltage reference governed by said control or regulation module that carries out energy-management operations.

8. The apparatus as set forth in claim 1, wherein said vehicle energy-recovery stage that supplies said second voltage comprises one or more regenerative shock absorbers and/or one or more regenerative brakes.

9. A method for managing the energy supplied to a low-voltage system of a vehicle, said vehicle comprising a low-voltage system and a high-voltage system as set forth in claim 1, said method comprising carrying out energy-management operations at least by the alternator, regulating the second voltage of said DC-DC converter via a control procedure of a hysteretic type comprising an operation of threshold comparison with hysteresis of the value of said second voltage, and an operation of activation or deactivation of said DC-DC converter on the basis of the result of said comparison operation, wherein said method comprises setting an additional load in parallel with the input of the converter that can be selectively connected to the high-voltage bus, and, if the power supplied by the energy-recovery stage is higher than a power absorbed by the converter, it comprises keeping the DC-DC converter always activated, with a current limitation, and selecting the connection of the additional load according to a further hysteretic control procedure, in particular based upon the second voltage or upon the state of charge, said further hysteretic control procedure further comprising respective thresholds for the additional load and for the converter and envisages setting the threshold value that controls selective connection of the additional load to the high-voltage bus at a voltage value higher than the threshold value of activation of the converter, so that, as the second voltage increases, first the DC-DC converter is activated, and then, in the case where the voltage continues to rise, the additional load is activated, and, instead, as the second voltage decreases, the second voltage is first deactivated the additional load, and then, in the case where the second voltage continues to drop, the DC-DC converter is deactivated.

10. The method as set forth in claim 9, wherein said operation of setting an additional load comprises setting an additional load circuit connected in parallel between the high-voltage bus and ground, which comprises a first circuit for activation of a faster-activation load, with higher triggering threshold, and/or a second circuit for activation of a slower-activation load, with threshold higher than the second nominal voltage of the high-voltage bus and lower than said higher triggering threshold.

* * * * *